US012657296B2

(12) United States Patent
    Albero et al.

(10) Patent No.:    US 12,657,296 B2
(45) Date of Patent:        Jun. 16, 2026

(54) ARTIFICIAL INTELLIGENCE-BASED DETECTION OF ANOMALIES IN MOVEMENT OR ACCESSING OF ELECTRONIC DATA POST-DATA TRANSMISSION

(71) Applicant: BANK OF AMERICA CORPORATION, Charlotte, NC (US)

(72) Inventors: George Albero, Charlotte, NC (US); Jeffrey K. Johnson, Cornelius, NC (US); Sanjay Lohar, Charlotte, NC (US); Tonya Kyra Miller, Charlotte, NC (US); Erica Reliford, Kannapolis, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 141 days.

(21) Appl. No.: 18/768,502

(22) Filed: Jul. 10, 2024

(65) Prior Publication Data

US 2026/0017368 A1     Jan. 15, 2026

(51) Int. Cl.
    *G06F 21/55*        (2013.01)

(52) U.S. Cl.
    CPC ...... *G06F 21/554* (2013.01); *G06F 2221/034* (2013.01)

(58) Field of Classification Search
    CPC .......................... G06F 21/554; G06F 2221/034
    See application file for complete search history.

(56) References Cited

U.S. PATENT DOCUMENTS

| | | | |
|---|---|---|---|
| 9,117,213 B2 | 8/2015 | Everett | |
| 9,143,892 B2 | 9/2015 | Kuehnel | |
| 9,298,914 B1 | 3/2016 | McCorkendale | |
| 9,916,468 B2 | 3/2018 | Long | |
| (Continued) | | | |

FOREIGN PATENT DOCUMENTS

| | | | | |
|---|---|---|---|---|
| CN | 112650956 A | * | 4/2021 | ............. G06F 21/64 |
| CN | 117010013 A | * | 11/2023 | ......... G06F 21/6245 |
| (Continued) | | | | |

OTHER PUBLICATIONS

Translation of Chen, CN 112650956 A, 2 pages (Year: 2021).*
Translation of Wu, CN 117010013 A, 4 pages (Year: 2023).*

*Primary Examiner* — Christopher A Revak
(74) *Attorney, Agent, or Firm* — Moore & Van Allen PLLC; Nicholas C. Russell

(57)                ABSTRACT

Artificial-Intelligence (AI) in the form of Machine Leaning models are implemented to detect anomalies in data movement and/or access post-data transmission. Specifically, tracking beacons, which are configured to transmit signals periodically and/or when encountering a hop in a data route, are inserted in data sets prior to transmitting the data sets to a third-party entity. Tracking beacons may also be configured such that transmission of a signal from the beacon triggers acquisition and initiates communication of access logs. In response to receiving signals from the tracking beacons and/or access logs, ML models which have been trained to detect anomalies in data movement and/or access based on historical movement and/or access patterns of the same/similar data sets are executed to detect any such anomalies based, at least on information included within and/or derived from the tracking beacon signal and/or the access logs.

20 Claims, 5 Drawing Sheets

(56) References Cited

U.S. PATENT DOCUMENTS

| | | | | |
|---|---|---|---|---|
| 10,360,399 B2 | 7/2019 | Long | | |
| 10,803,540 B2 | 10/2020 | Schuler | | |
| 11,374,953 B2 | 6/2022 | Givental | | |
| 11,444,976 B2 * | 9/2022 | Brannon | ............. | G06F 16/9577 |
| 11,902,296 B2 | 2/2024 | Mortensen | | |
| 12,149,551 B2 | 11/2024 | An | | |
| 12,238,127 B1 * | 2/2025 | Shivamoggi | .............. | G06F 7/08 |
| 12,513,221 B1 * | 12/2025 | Nanduri | ................ | H04L 67/535 |
| 2011/0145918 A1 * | 6/2011 | Jung | ........................ | G06F 21/52 |
| | | | | 726/22 |
| 2015/0088777 A1 * | 3/2015 | Chauhan | ............. | G06Q 50/265 |
| | | | | 705/325 |
| 2016/0029171 A1 | 1/2016 | Kuehnel | | |
| 2016/0360418 A1 | 12/2016 | Guan | | |
| 2019/0230109 A1 | 7/2019 | Hu | | |
| 2019/0311136 A1 * | 10/2019 | Pai | ........................... | H04L 63/20 |
| 2020/0162407 A1 * | 5/2020 | Tillotson | ................. | H04L 43/16 |
| 2021/0027302 A1 | 1/2021 | Resheff | | |
| 2021/0051176 A1 * | 2/2021 | Stolfo | ................. | H04L 63/1491 |
| 2021/0365774 A1 | 11/2021 | Muhammad | | |
| 2022/0036154 A1 | 2/2022 | Yeddu | | |
| 2024/0241982 A1 | 7/2024 | Gordon | | |
| 2024/0403662 A1 * | 12/2024 | Schell | .................... | G06N 20/00 |
| 2025/0028994 A1 * | 1/2025 | Rathi | ..................... | G06N 20/00 |

FOREIGN PATENT DOCUMENTS

| | | | | | |
|---|---|---|---|---|---|
| WO | WO-2019213376 A1 * | 11/2019 | ........... | G06F 21/554 |
| WO | WO-2023191811 A1 * | 10/2023 | ............. | G06N 3/084 |

* cited by examiner

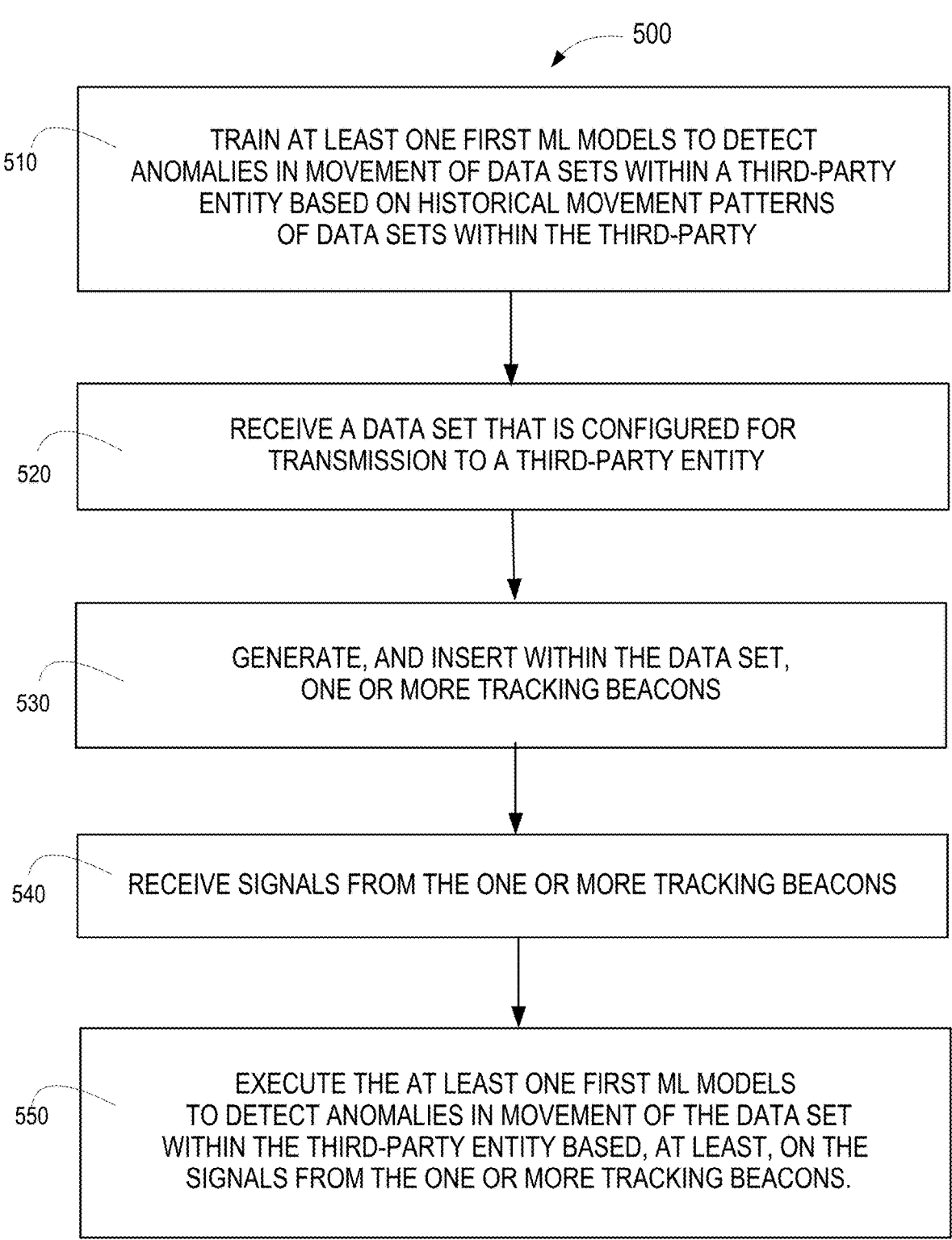

500

510
TRAIN AT LEAST ONE FIRST ML MODELS TO DETECT
ANOMALIES IN MOVEMENT OF DATA SETS WITHIN A THIRD-PARTY
ENTITY BASED ON HISTORICAL MOVEMENT PATTERNS
OF DATA SETS WITHIN THE THIRD-PARTY

520
RECEIVE A DATA SET THAT IS CONFIGURED FOR
TRANSMISSION TO A THIRD-PARTY ENTITY

530
GENERATE, AND INSERT WITHIN THE DATA SET,
ONE OR MORE TRACKING BEACONS

540
RECEIVE SIGNALS FROM THE ONE OR MORE TRACKING BEACONS

550
EXECUTE THE AT LEAST ONE FIRST ML MODELS
TO DETECT ANOMALIES IN MOVEMENT OF THE DATA SET
WITHIN THE THIRD-PARTY ENTITY BASED, AT LEAST, ON THE
SIGNALS FROM THE ONE OR MORE TRACKING BEACONS.

FIG. 4

ARTIFICIAL INTELLIGENCE-BASED DETECTION OF ANOMALIES IN MOVEMENT OR ACCESSING OF ELECTRONIC DATA POST-DATA TRANSMISSION

FIELD OF THE INVENTION

The present invention is generally directed to data security and, more specifically, detecting anomalies in movement and/or access of an electronic data set after the data set has been transmitted to a third-party entity.

BACKGROUND

When data moves outside of the internal boundaries of an entity's computing network (e.g., data transfers to an external third-party entity, including cross international border data transfers and the like) it is a challenge to ensure that such data is used in accordance with constraints placed on the data by the originating entity. For example, the originating data may require that the third-party remain within prescribed geo-physical boundaries, such as within the boundaries of a designated country or countries. In other examples, the originating entity may require that the third-party (i) store the data in specific manners using only designated storage techniques and/or devices, (ii) provide access to only designated individuals within the third-party entity, (iii) prohibit certain actions from being taken on the data, such as copying of the data and the like.

Therefore, a need exists to develop systems, computerized methods and the like that serve to provide for a data originating entity to detect anomalies in movement, access and/or actions performed on a data set after the data has been transmitted to a third-party entity (i.e., after the data has moved outside of originating entity's internal computing network). In this regard, the desired systems, computerized methods, and the like should be intelligent enough to differentiate between data movement, access and/or actions performed on the data that are normal and those which are actual anomalies. As a result, the desires systems, computerized-methods, and the like should allow for the originating entity to maintain a level of control and/or surveillance data that is no longer within the entity's immediate (i.e., internal computing network) control.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by implementing Artificial-Intelligence (AI), specifically Machine Learning (ML) models to detect anomalies in data movement and/or access post-data transmission (i.e., after the data has been transmitted to a third party. In specific embodiments of the invention, tracking beacons are inserted in data sets prior to transmitting the data sets to a third-party entity. In response to receiving signals from the tracking beacons, ML models which have been trained to detect anomalies in data movement based on historical movement patterns of the same/similar data sets are executed to detect any such anomalies based, at least on information included within and/or derived from the tracking beacon signal.

In specific embodiments of the invention, the ML models are trained to detect anomalies in movement, specifically anomalies in the geo-location of the data location based at, least, on historical geo-location patterns of same/similar data sets. For example, a data set may have specified geo-boundaries, which may prohibit the data set from being communicated out of a specified country or region. In such embodiments of the invention, a geo location is derived from the tracking beacon signal (e.g., IP address) or, in those embodiments in which the tracking beacon is a Global Positioning System (GPS) tracking beacon, the geo-location is identified from GPS coordinates in the signal. The ML models use the geo-location of the data set to determine if anomalies in movement/geo-location are evident.

In other specific embodiments of the invention, the ML models are trained to detect anomalies in movement, specifically anomalies in a data route encountered by the data set at the third-party entity based at, least on historical data routes of the same or similar data sets. In such embodiments of the invention, the tracking beacons are configured to transmit a signal each time the data set encounters a different in the hop (i.e., router, switch, storage device or the like) at the third-party entity. Once signals are received from the tracking beacon(s) and hops identified, a time-based data movement map is generated and is used an input to the ML models in determining anomalies in the data route of the data set within the third-party entity.

In further specific embodiments of the invention, the tracking beacons are configured such that transmission of a tracking beacon signal triggers acquisition and initiates communication of access logs that indicate (i) identities of parties who accessed the data sets, (ii) when the data set was accessed and/or (iii) actions performed on the data set during such access occurrences. In such embodiments of the invention, ML models are trained to detect anomalies in access, specifically anomalies in (i) who accessed (ii) when access occurred and (iii) action performed on the data while at the third-party entity based at, least on historical access patterns of the same or similar data sets. Once access logs are received and (i) parties who accessed the data set, (ii) time at which the data set was accessed and/or (iii) actions performed on the data set during such access occurrences are identified, such data is used as inputs to the ML models in determining anomalies in the accessing of the data set within the third-party entity.

A system for detecting anomalies in data movement post-data transmission define first embodiments of the invention. The system includes a first computing platform having a first memory and one or more first computing processor devices in communication with the first memory. The first memory stores a tracking beacon deployment platform that is executable by at least one of the one or more computing processor devices. The tracking beacon deployment platform is configured to receive a data set that is configured for transmission to a third-party entity and, in response, generate, and insert within the data set, one or more tracking beacons. In response to tracking beacon insertion, the tracking beacon deployment platform is configured to initiate transmission of the data set with the one or more inserted tracking beacons to the third-party entity.

The system additionally includes a second computing platform having a second memory and one or more second computing processor devices in communication with the second memory. The second memory stores a data set anomaly detection platform that is executable by at least one of the one or more second computing processor device. The data set anomaly detection platform includes an Artificial Intelligence (AI) engine having one or more Machine Learning (ML) models. The data set anomaly detection platform is configured to train at least one first ML model from amongst the one or more ML models to detect anomalies in movement of data sets within the third-party entity based on historical movement patterns of data sets within the third-party. Further, data set anomaly detection platform is configured to receive signals from the one or more tracking beacons and execute the at least one first ML model to detect anomalies in movement of the data set within the third-party entity based, at least, on the signals from the one or more tracking beacons.

In specific embodiments of the system, the anomalies in movement are defined as anomalies in a geo-location of the datasets and the historical movement patterns are defined as historical geo-location patterns. In related embodiments of the system, the data set anomaly detection platform is further configured to derive one or more geo-locations of the data set from information included in the signals from the one or more tracking beacons and execute the at least one first ML model to detect anomalies in the one or more geo-locations of the data set within the third-party entity.

In other specific embodiments of the system, the tracking beacon deployment platform is further configured to generate, and insert within the data set, the one or more tracking beacons which are configured to transmit a signal for each instance of the data set encountering a hop (i.e., a physical or virtual device) in a data route within, at least, the third-party entity. In related embodiments of the system, the data set anomaly detection platform is further configured to identify hops that the data set encounters at the third-party entity from information included in the signals from the one or more tracking beacons and generate a time-based movement map of the data set within the third-party entity that includes the identified hops. In such embodiments of the system, the data set anomaly detection platform is further configured to execute the at least one first ML models to detect anomalies in the data route of the data set within the third-party entity based, at least, on the time-based movement map.

In still further specific embodiments of the system, the tracking beacon deployment platform is further configured to the one or more tracking beacons are generated such that they are configured to trigger, upon transmission of the signals, communication of at least one access log to the data set anomaly detection platform. The at least one access log indicates one or more of (i) times at which the data set was accessed (ii) identities of accessing parties and (iii) actions performed on the data set during a corresponding access occurrence. In related embodiments of the system, the data set anomaly detection platform is further configured to train at least one second ML model from amongst the one or more ML models to detect anomalies in at least one of (i) when the data set is accessed, (ii) who accessed the data set and (iii) actions performed on the data set based on historical access patterns of data sets within the third-party. In addition, the data set anomaly detection platform is further configured to receive the at least one access log from the third-party entity and execute the at least one second ML model to detect anomalies in the accessing of the data set within the third-party entity based, at least, on information in the at least one access log.

Moreover, in additional embodiments of the system, the data set anomaly detection platform is further configured to train at least one third ML model from amongst the one or more ML models to detect anomalies in data set replication based on historical data set movement patterns of data sets within the third-party entity, and execute the at least one third ML model to detect anomalies in data set replication within the third-party entity based, at least, on the signals from the one or more tracking beacons. In such embodiments of the system, anomalies in data set replication are detected based on receiving signals from at least two instances of the one or more tracking beacons.

A computer-implemented method for detecting anomalies in data movement post-data transmission defines second embodiments of the invention. The computer-implemented method is executed by one or more computing processor devices. The computer-implemented method includes training at least one first ML models to detect anomalies in movement of data sets within a third-party entity based on historical movement patterns of data sets within the third-party. Further, the computer-implemented method includes (i) receiving a data set that is configured for transmission to a third-party entity, (ii) generating, and inserting within the data set, one or more tracking beacons and (iii) initiating transmission of the data set with the one or more inserted tracking beacons to the third-party entity. In addition, the computer-implemented method includes receiving signals from the one or more tracking beacons and executing the at least one first ML models to detect anomalies in movement of the data set within the third-party entity based, at least, on the signals from the one or more tracking beacons.

In specific embodiments of the computer-implemented method, training further includes training the at least one first more ML model to detect the anomalies in the movement of data sets within the third-party entity based on historical movement patterns of data sets within the third-party entity, such that, the anomalies in movement are defined as anomalies in a geo-location of the datasets and the historical movement patterns are defined as historical geo-location patterns. In such embodiments the computer-implemented method further includes deriving one or more geo-locations of the data set from information included in the signals from the one or more tracking beacons and executing the at least one first ML model to detect anomalies in the one or more geo-locations of the data set within the third-party entity.

In other specific embodiments of the computer-implemented method, generating further includes generating, and inserting within the data set, the one or more tracking beacons, such that, the one or more tracking beacons are configured to transmit a signal for each instance of the data set encountering a hop in a data route within, at least, the third-party entity. In such embodiments the computer-implemented method further includes identifying hops that the data set encounters at the third-party entity from information included in the signals from the one or more tracking beacons, generating a time-based movement map of the data set within the third-party entity that includes the identified hops, and executing the at least one first ML model to detect anomalies in the data route of the data set within the third-party entity based, at least on the time-based movement map.

In still further specific embodiments of the computer-implemented method, generating further includes generating, and inserting within the data set, the one or more tracking beacons, such that, the one or more tracking beacons are configured to trigger, upon transmission of the signals, communication of at least one access log to the data set anomaly detection platform. The at least one access log indicates one or more of (i) times at which the data set was accessed (ii) identities of accessing parties and (iii) actions performed on the data set during a corresponding access occurrence. In related embodiments the computer-implemented method includes training at least one second ML model from amongst the one or more ML models to detect anomalies in at least one of (i) when the data set is accessed, (ii) who accessed the data set and (iii) actions performed on the data set based on historical access patterns of data sets within the third-party. In addition, the computer-implemented method includes receiving the at least one access log from the third-party entity and executing the at least one second ML model to detect anomalies in the accessing of the data set within the third-party entity based, at least, on information in the at least one access log.

Moreover, in additional specific embodiments the computer-implemented includes training at least one third ML models from amongst the one or more ML models to detect anomalies in data set replication based on historical data set movement patterns of data sets within the third-party; and executing the at least one third ML models to detect anomalies in data set replication within the third-party entity based, at least, on the signals from the one or more tracking beacons. The anomalies in data set replication are detected based on receiving signals from at least two instances of the one or more tracking beacons.

A computer program product including a non-transitory computer-readable medium defines third embodiments of the invention. The non-transitory computer-readable medium include sets of codes for causing one or more computing devices to train at least one first ML models to detect anomalies in movement of data sets within a third-party entity based on historical movement patterns of data sets within the third-party. Moreover, the sets of codes cause the computing devices to receive a data set that is configured for transmission to a third-party entity, generate, and insert within the data set, one or more tracking beacons and initiate transmission of the data set with the one or more inserted tracking beacons to the third-party entity. Once the data set has been transmitted, the sets of codes are further configured to cause the computing devices to receive signals from the one or more tracking beacons and execute the at least one first ML models to detect anomalies in movement of the data set within the third-party entity based, at least, on the signals from the one or more tracking beacons.

In specific embodiments of the computer program product, the set of codes configured to cause the one or computer devices to train are further configured to cause the one or mor computer devices to train the at least one first more ML model to detect the anomalies in the movement of data sets within the third-party entity based on historical movement patterns of data sets within the third-party entity, such that, the anomalies in movement are defined as anomalies in a geo-location of the datasets and the historical movement patterns are defined as historical geo-location patterns. In such embodiments of the computer program product, the sets of codes further includes sets of codes for causing the computing device(s) to derive one or more geo-locations of the data set from information included in the signals from the one or more tracking beacons and execute the at least one first ML model to detect anomalies in the one or more geo-locations of the data set within the third-party entity.

In still further specific embodiments of the computer program product, the set of codes configured to cause the one or computer devices to generate are further configured to cause the one or mor computer devices to generate, and insert within the data set, the one or more tracking beacons, such that, the one or more tracking beacons are configured to transmit a signal for each instance of the data set encountering a hop in a data route within, at least, the third-party entity. In such embodiments of the computer program product, the sets of codes further includes sets of codes for causing the computing device(s) to identify hops that the data set encounters at the third-party entity from information included in the signals from the one or more tracking beacons, generate a time-based movement map of the data set within the third-party entity that includes the identified hops, and execute the at least one first ML model to detect anomalies in the data route of the data set within the third-party entity based, at least, on the time-based movement map.

In additional specific embodiments of the computer program product, the set of codes configured to cause the one or computer devices to generate are further configured to cause the one or mor computer devices to generate, and insert within the data set, the one or more tracking beacons, wherein the one or more tracking beacons are configured to trigger, upon transmission of the signals, communication of at least one access log to the data set anomaly detection platform, such that, the at least one access log indicates one or more of (i) times at which the data set was accessed (ii) identities of accessing parties and (iii) actions performed on the data set during a corresponding access occurrence. In related embodiments of the computer program product, the sets of codes further include sets of codes for causing the one or more computing devices to train at least one second ML model from amongst the one or more ML models to detect anomalies in at least one of (i) when the data set is accessed, (ii) who accessed the data set and (iii) actions performed on the data set based on historical access patterns of data sets within the third-party entity, receive the at least one access log from the third-party entity, and execute the at least one second ML model to detect anomalies in the accessing of the data set within the third-party entity based, at least, on information in the at least one access log.

Moreover, in further specific embodiments of the computer program product, a set of codes further include sets of codes for causing the one or more computing devices to train at least one third ML models from amongst the one or more ML models to detect anomalies in data set replication based on historical data set movement patterns of data sets within the third-party and a set of codes for causing the computing device(s) to execute the at least one third ML models to detect anomalies in data set replication within the third-party entity based, at least, on the signals from the one or more tracking beacons, wherein the anomalies in data set replication are detected based on receiving signals from at least two instances of the one or more tracking beacons.

Thus, as described in detail above, present embodiments of the invention include systems, methods, computer program products and/or the like that implementing Artificial-Intelligence (AI), specifically Machine Learning (ML) models to detect anomalies in data movement and/or access post-data transmission. Specifically, tracking beacons are inserted in data sets prior to transmitting the data sets to a third-party entity, which are configured to transmit signals periodically and/or when encountering a hop in a data route. In specific embodiments, the transmission of a tracking beacon signal triggers acquisition and initiates communication of access logs. In response to receiving signals from the tracking beacons and/or access logs, ML models which have been trained to detect anomalies in data movement and/or access based on historical movement and/or access patterns of the same/similar data sets are executed to detect any such anomalies based, at least on information included within and/or derived from the tracking beacon signal and/or the access logs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
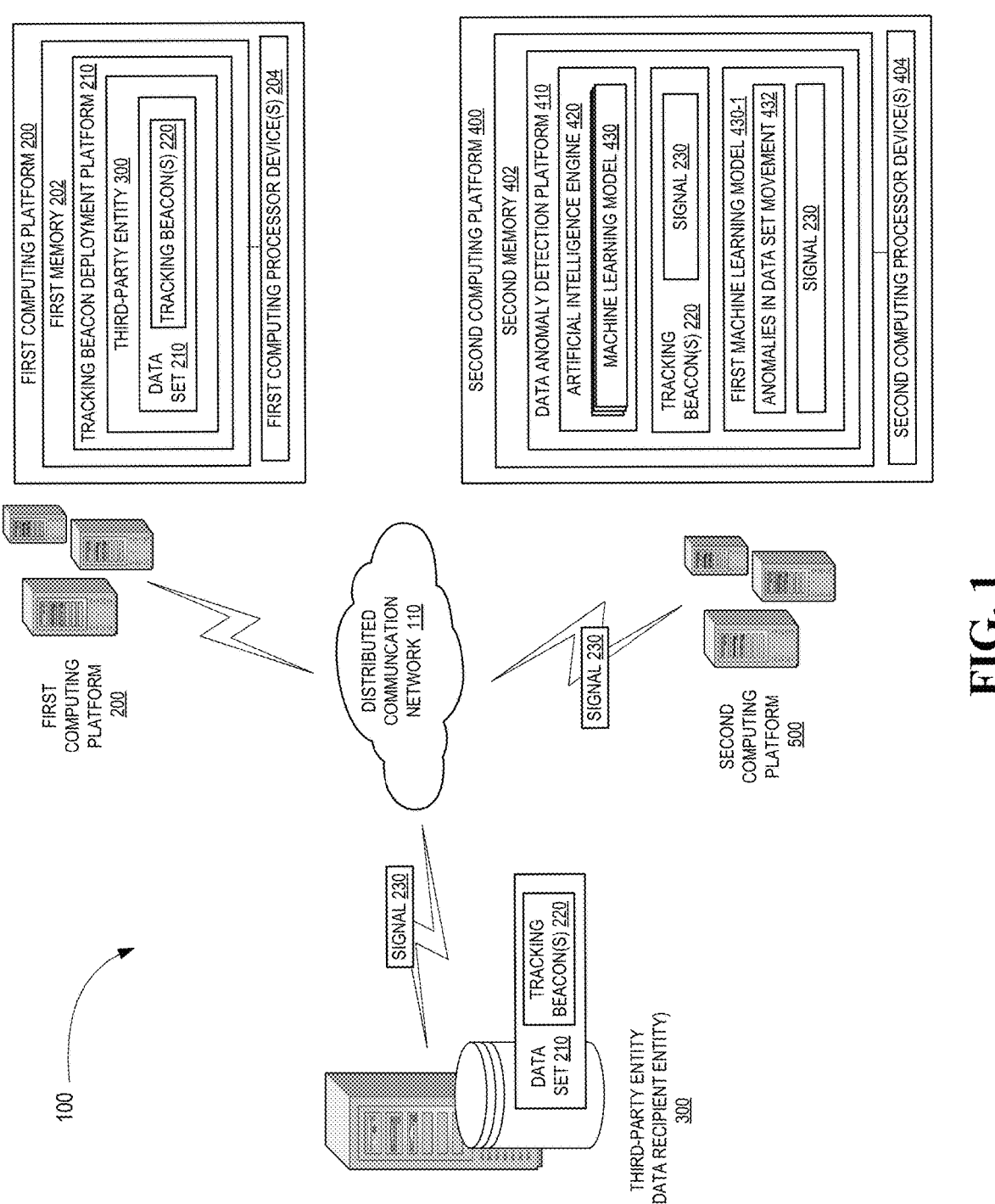
Figure 2:
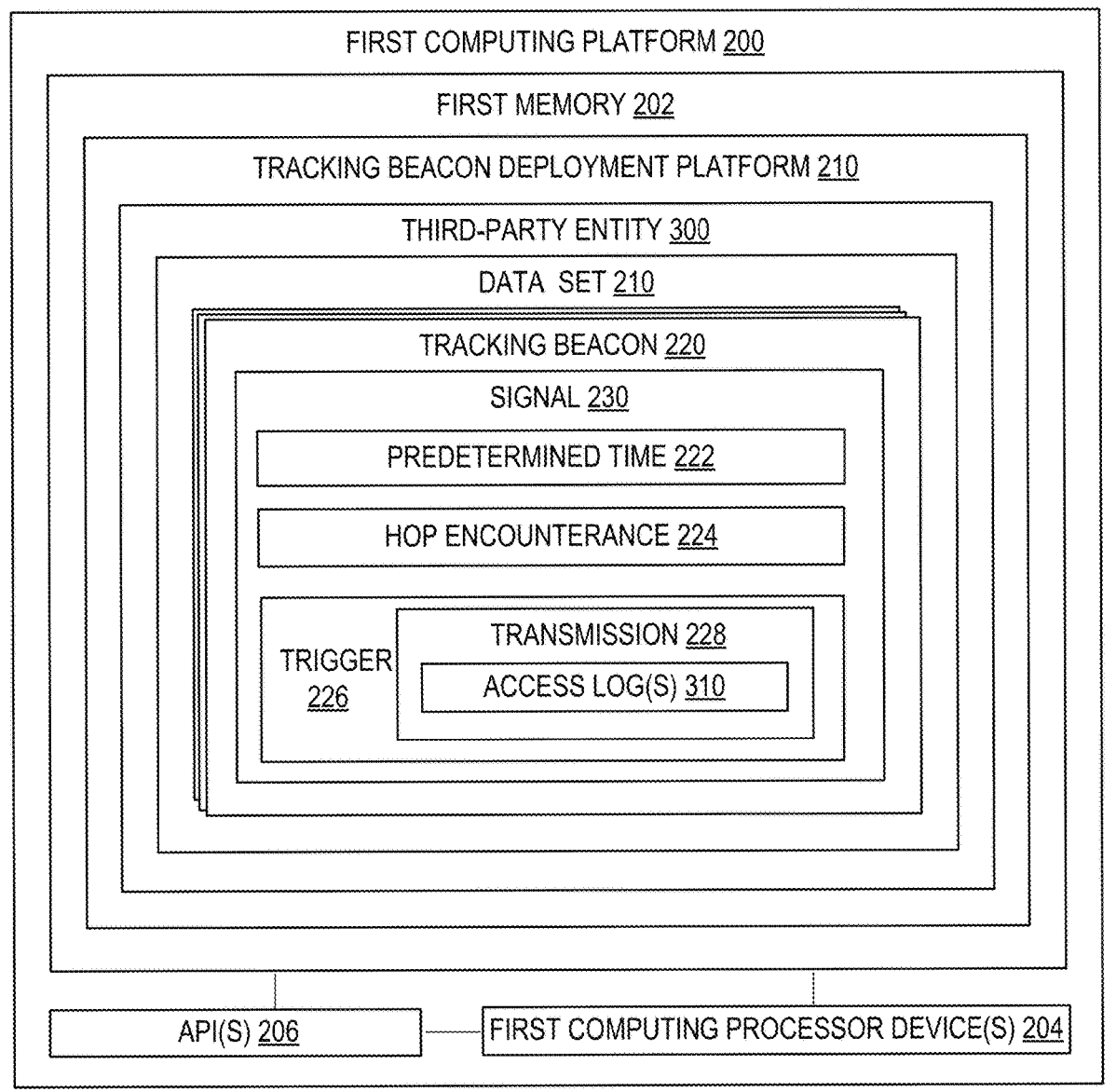
Figure 3:
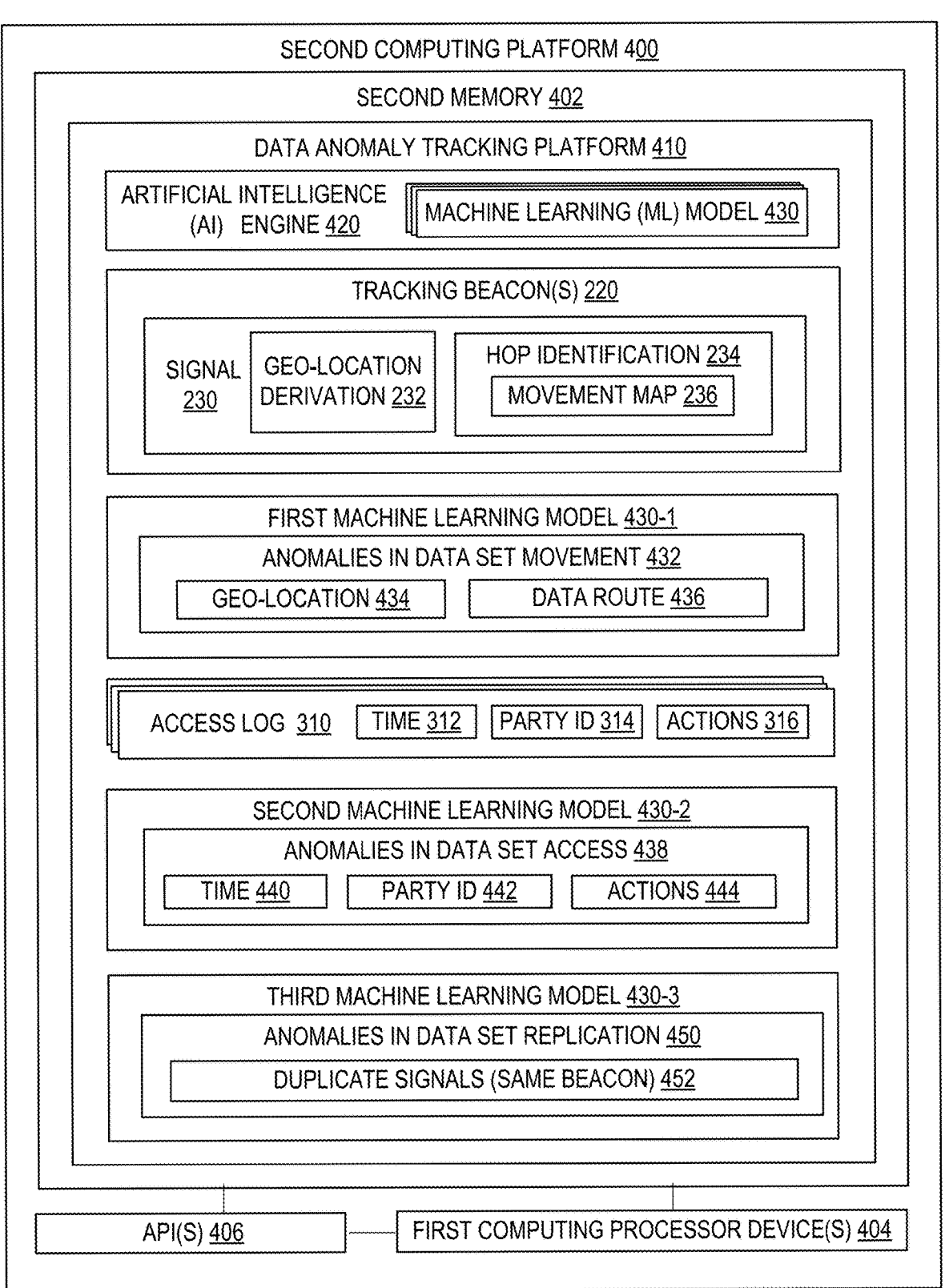
Figure 5:
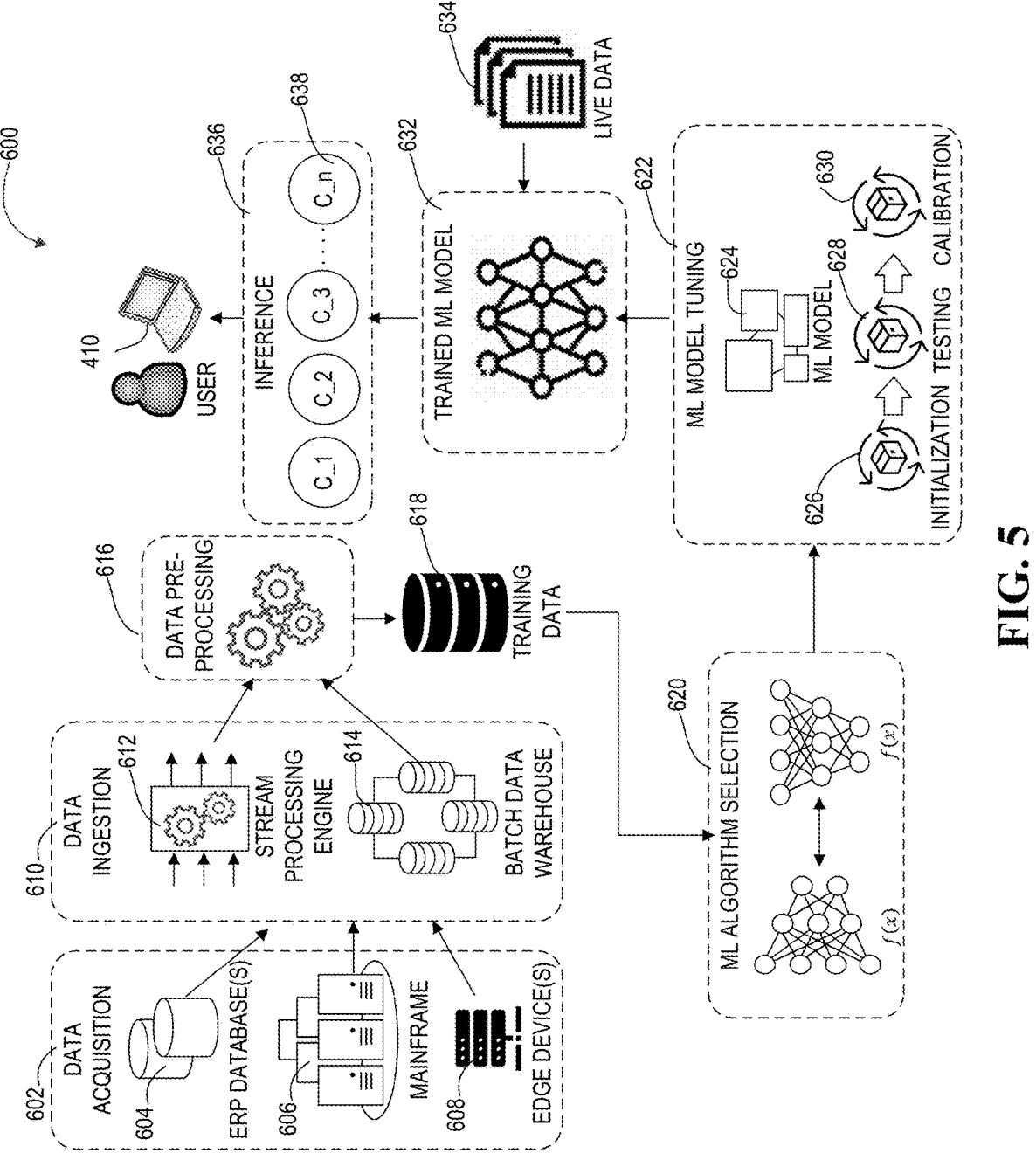

Having thus described embodiments of the disclosure in general terms, reference will now be made to the accompanying drawings, wherein:

FIG. 1 is a schematic/block diagram of a system for detecting anomalies in data movement post-data transmission, in accordance with embodiments of the present invention;

FIG. 2 is a block diagram of a computing platform including a tracking beacon deployment platform, in accordance with alternate embodiments of the present invention;

FIG. 3 is a block diagram of a computing platform including a data set anomaly detection platform, in accordance with embodiments of present invention;

FIG. 4 is a flow diagram of a method for detecting anomalies in data movement post-data transmission, in accordance with embodiments of the invention; and FIG. 5 is a schematic diagram of an exemplary machine learning (ML) subsystem architecture, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform includes a processor, a non-transitory storage medium (i.e., memory), a communications device, and a display. The computing platform may be configured to support user logins and inputs from any combination of similar or disparate devices.

Accordingly, the computing platform includes servers, personal desktop computer, laptop computers, mobile computing devices and the like.

Thus, systems, apparatus, and methods are described in detail below that provide for implementing Artificial-Intelligence (AI), specifically Machine Learning (ML) models to detect anomalies in data movement and/or access post-data transmission (i.e., after the data has been transmitted to a third party. In specific embodiments of the invention, tracking beacons are inserted in data sets prior to transmitting the data sets to a third-party entity. In response to receiving signals from the tracking beacons, ML models which have been trained to detect anomalies in data movement based on historical movement patterns of the same/similar data sets are executed to detect any such anomalies based, at least on information included within and/or derived from the tracking beacon signal.

In specific embodiments of the invention, the ML models are trained to detect anomalies in movement, specifically anomalies in the geo-location of the data location based at, least, on historical geo-location patterns of same/similar data sets. For example, a data set may have specified geo-boundaries, which may prohibit the data set from being communicated out of a specified country or region. In such embodiments of the invention, a geo location is derived from the tracking beacon signal (e.g., IP address) or, in those embodiments in which the tracking beacon is a Global Positioning System (GPS) tracking beacon, the geo-location is identified from GPS coordinates in the signal. The ML models use the geo-location of the data set to determine if anomalies in movement/geo-location are evident.

In other specific embodiments of the invention, the ML models are trained to detect anomalies in movement, specifically anomalies in a data route encountered by the data set at the third-party entity based at, least on historical data routes of the same or similar data sets. In such embodiments of the invention, the tracking beacons are configured to transmit a signal each time the data set encounters a different in the hop (i.e., router, switch, storage device or the like) at the third-party entity. Once signals are received from the tracking beacon(s) and hops identified, a time-based data movement map is generated and is used an input to the ML models in determining anomalies in the data route of the data set within the third-party entity.

In further specific embodiments of the invention, the tracking beacons are configured such that transmission of a tracking beacon signal triggers acquisition and initiates communication of access logs that indicate (i) identities of parties who accessed the data sets, (ii) when the data set was accessed and/or (iii) actions performed on the data set during such access occurrences. In such embodiments of the invention, ML models are trained to detect anomalies in access, specifically anomalies in (i) who accessed (ii) when access occurred and (iii) action performed on the data while at the third-party entity based at, least on historical access patterns of the same or similar data sets. Once access logs are received and (i) parties who accessed the data set, (ii) time at which the data set was accessed and/or (iii) actions performed on the data set during such access occurrences are identified, such data is used as inputs to the ML models in determining anomalies in the accessing of the data set within the third-party entity.

Referring to FIG. 1, a schematic/block diagram is presented of a system 100 for detecting anomalies in movement of data post-data transmission (i.e., after the data has been transmitted to a third-party entity), in accordance with embodiments of the present invention. The system is implemented within a distributed communication network 110, which includes the Internet, one or more intranets, one or more cellular networks or the like. The system includes first computing platform 200, which includes first memory 202 and one or more first computing processor devices 204 in communication with first memory 202. First memory 202 stores a tracking beacon deployment platform 210, which is executable by at least one of the one or more first computing processor devices 204.

Tracking beacon deployment platform 210 is configured to a receive a data set 210 that is destined for communication/transmission to a third-party entity 300. The third party-entity is any entity that is external from the entity transmitting the data, such as, but not limited to, a vendor/service provide, client, or the like. In accordance with embodiments of the present invention, the data transmitting entity desires to maintain a level of control over the data after the data is no longer in their possession. In this regard, the data transmitting entity may desire to ensure that the data is only (i) located/stored in designated location and/or designated devices, or (ii) accessed by authorized parties, during authorized time period, and/or (iii) undergoes authorized actions when accessed.

In response to receiving data set 210, tracking beacon deployment platform 210 is configured to generate or otherwise identify, and insert within data set 210, one or more tracking beacons 220, which are configured to transmit signals 230 back to the data transmitting entity. In specific embodiments of the invention, the third-party entity 300 will have acquiesced in the inclusion of such tracking beacons 220 within the data set 210. In response to inserting the tracking beacon(s) 220 in the data set, tracking beacon deployment platform 210 is further configured to initiate transmission of the data set 210 to the third-party entity 300 or, alternatively, forward the data set to another application/service prior to transmitting the data set 210 to the third-party entity 300.

System 100 additionally includes second computing platform 400 which includes second memory 402 and one or more second computing processor devices 404 in communication with second memory 402. Second memory 402 stores a data anomaly detection platform 410 which is executable by at least one of the second computing processor device(s) 404. Data anomaly detection platform 410 includes an Artificial Intelligence (AI) engine 420 that includes one or more Machine Learning (ML) models 430.

Data anomaly detection platform 410 is configured to train at least one first ML model 430-1 from amongst the one or more ML models 430 to detect anomalies in the data set movement 432 within the third-party entity 300. Such training is based, at least, on historical movement patterns of data sets within the third-party of the same/similar or data sets. The historical movement patterns may be identified from signals 230 transmitted by tracking beacons 220 or by any other means. Thus, in specific embodiments of the system, the ML model is specific to the third-party-entity and same or similar data sets. Moreover, in further specific embodiments of the invention, the training is based on predetermined rules, which define prescribed movement attributes, such as locations where data sets are authorized to be located/moved within, networks/devices which the data set are authorized to be processed and/or stored on and the like.

Once the first ML models 430-1 have been initially trained and the data set 210 has been transmitted to the third-party entity 300, data anomaly detection platform 410 is configured to receive signals 230 from tracking beacon(s) 220 and execute the first ML models 430-1 to detect anomalies in data set movement 432 within the third-party entity 300 based, at least, on the signals 230 from the tracking beacon(s) 220. In this regard, information in the signals 230 or information derived/determined from the information in the signals 230 is used as inputs to the first ML model(s) 430-1 to detect any anomalies in data set movement 432 within the third-party entity 300.

Referring to FIG. 2, a block diagram is depicted of first computing platform 200 highlighting various alternate embodiments of the tracking beacon deployment platform 210, in accordance with embodiments of the present invention. First computing platform 200 may comprise one or multiple computing devices, such as servers, storage devices or the like. As previously discussed in relation to FIG. 1, first computing platform 200 includes first memory 202, which may comprise volatile and/or non-volatile memory, such as read-only memory (ROM) and/or random-access memory (RAM), EPROM, EEPROM, flash cards, or any memory common to computing platforms. Moreover, first memory 202 may comprise cloud storage, such as provided by a cloud storage service and/or a cloud connection service.

Further, first computing platform 200 includes one or more first computing processor devices 204, which may be an application-specific integrated circuit ("ASIC"), or other chipset, logic circuit, or other data processing device. First computing processor device(s) 204 may execute one or more application programming interface (APIs) 206 that interface with any resident programs, such as tracking beacon deployment platform 210 or the like, stored in first memory 202 of first computing platform 200 and any external programs. First computing platform 200 includes various processing sub-systems (not shown in FIG. 2) embodied in hardware, firmware, software, and combinations thereof, that enable the functionality of first computing platform 200 and the operability of first computing platform 200 on a distributed communication network 110 (shown in FIG. 1). For example, processing sub-systems allow for initiating and maintaining communications and exchanging data with other networked devices. For the disclosed aspects, processing sub-systems of first computing platform 200 includes any processing sub-system portion used in conjunction with tracking beacon deployment platform 210 and related models, tools, routines, sub-routines, applications, sub-applications, sub-modules thereof.

In specific embodiments of the present invention, first computing platform 200 additionally includes a communications module (not shown in FIG. 2) embodied in hardware, firmware, software, and combinations thereof, that enables electronic communications between components of first computing platform 200 and other networks and network devices, such as network devices of third-party entity 300. Thus, communication module includes the requisite hardware, firmware, software and/or combinations thereof for establishing and maintaining a network communication connection with one or more devices and/or networks.

As previously discussed in relation to FIG. 1, first memory 202 of first computing platform 300 stores tracking beacon deployment platform 210 tracking beacon deployment platform 210, which is executable by at least one of the one or more first computing processor devices 204, is configured to a receive a data set 210 that is destined for transmission to a third-party entity 300. As previously discusses, in accordance with embodiments of the present invention, the data transmitting entity desires to maintain a level of control over the data after the data is no longer in their possession. In this regard, the data transmitting entity may desire to ensure that the data is only (i) located/stored in designated location and/or designated devices, or (ii) accessed by authorized parties, during authorized time period, and/or (iii) undergoes authorized actions when accessed.

In response to receiving data set 210, tracking beacon deployment platform 210 is configured to generate or otherwise identify, and insert within data set 210, one or more tracking beacons 220, which are configured to transmit signals 230 back to the data transmitting entity. In specific embodiments of the system 100, the third-party entity 300 will have acquiesced in the inclusion of such tracking beacons 220 within the data set 210.

In specific embodiments of the system 100, tracking beacons 220 are configured to transmit signals 230 at a predetermined time (e.g., once every 30 seconds or the like) or in response to every hop (i.e., server, router, switch, storage device) encounterance 224 at the third-party entity 300. In other specific embodiments of the system 100, tracking beacons 220 are configured to trigger 226, upon signal transmission, acquisition and initiation of transmission 228 (back to the data transmitting entity) of access log(s) 310 which indicate, at least, one or more (i) when the data set was accessed, (ii) the identity of parties that accessed the data and (iii) actions that were performed on the data during the access occurrence (e.g., copied, modified, deleted, read-only and the like).

In response to inserting the tracking beacon(s) 220 in the data set, tracking beacon deployment platform 210 is further configured to initiate transmission of the data set 210 to the third-party entity 300 or, alternatively, forward the data set to another application/service prior to transmitting the data set 210 to the third-party entity 300.

Referring to FIG. 3, a block diagram is depicted of second computing platform 400 highlighting various alternate embodiments of the data anomaly detection platform 410, in accordance with embodiments of the present invention. Second computing platform 400 may comprise one or multiple computing devices, such as servers, storage devices or the like. As previously discussed in relation to FIG. 1, second computing platform 400 includes second memory 402, which may comprise volatile and/or non-volatile memory, such as read-only memory (ROM) and/or random-access memory (RAM), EPROM, EEPROM, flash cards, or any memory common to computing platforms. Moreover, second memory 402 may comprise cloud storage, such as provided by a cloud storage service and/or a cloud connection service.

Further, second computing platform 400 includes one or more second computing processor devices 404, which may be an application-specific integrated circuit ("ASIC"), or other chipset, logic circuit, or other data processing device. Second computing processor device(s) 404 may execute one or more application programming interface (APIs) 406 that interface with any resident programs, such as data anomaly detection platform 410 or the like, stored in second memory 402 of second computing platform 400 and any external programs. Second computing platform 400 includes various processing sub-systems (not shown in FIG. 3) embodied in hardware, firmware, software, and combinations thereof, that enable the functionality of second computing platform 400 and the operability of second computing platform 400 on a distributed communication network 110 (shown in FIG. 1). For example, processing sub-systems allow for initiating and maintaining communications and exchanging data with other networked devices. For the disclosed aspects, processing sub-systems of second computing platform 400 includes any processing sub-system portion used in conjunction with data anomaly detection platform 410 and related models, tools, routines, sub-routines, applications, sub-applications, sub-modules thereof.

In specific embodiments of the present invention, second computing platform 400 additionally includes a communications module (not shown in FIG. 3) embodied in hardware, firmware, software, and combinations thereof, that enables electronic communications between components of second computing platform 400 and other networks and network devices, such as network devices of third-party entity 300. Thus, communication module includes the requisite hardware, firmware, software and/or combinations thereof for establishing and maintaining a network communication connection with one or more devices and/or networks.

As previously discussed in relation to FIG. 1, second memory 402 of second computing platform 400 stores data anomaly detection platform 410, which is executable by at least one of the one or more second computing processor devices 404. Data anomaly detection platform 410 includes an Artificial Intelligence (AI) engine 420 that includes one or more Machine Learning (ML) models 430.

Data anomaly detection platform 410 is configured to train at least one first ML model 430-1 from amongst the one or more ML models 430 to detect anomalies in the data set movement 432 within the third-party entity 300. Anomalies in data set movement 432 include, but are not limited to, geo-location 434 and data route 436. Such training is based, at least, on historical movement patterns of data sets within the third-party of the same/similar or data sets, such as, geo-location patterns and/or data route patterns. The historical movement patterns may be identified from signals 230 transmitted by tracking beacons 220 or by any other means. Thus, in specific embodiments of the system, the ML model is specific to the third-party-entity and same or similar data sets. Moreover, in further specific embodiments of the invention, the training is based on predetermined rules, which define prescribed movement attributes, such as locations where data sets are authorized to be located/moved within, networks/devices which the data set are authorized to be processed and/or stored on and the like.

Once the first ML models 430-1 have been initially trained and the data set 210 has been transmitted to the third-party entity 300, data anomaly detection platform 410 is configured to receive signals 230 from tracking beacon(s) 220. In specific embodiments of the system, in which the tracking beacons are location-determining, such as GPS tracking beacons, signals 230 may include geo-location data in other embodiments of the system, data anomaly detection platform 410 is configured to perform a geo-location derivation 434 based on information included in the signal 230, such as IP address or the like. In other embodiments of the system, data anomaly detection platform 410 is configured to perform hop identification 234 based on information included in the signals 230 and generate a time-based movement/route map 236 that includes the hops encountered by the data set 210 within the third-party entity 300. The movement/route map 236 is time-based as a result of the timestamps included within the signals 230.

In response to receiving the signals 230 and, in some embodiments performing geo-location derivation 232 and/or hop identification 234/movement map 236 generation, data anomaly detection platform 410 is configured to execute the first ML models 430-1 to detect anomalies in data set movement 432 within the third-party entity 300 based, at least, on the signals 230 from the tracking beacon(s) 220. In this regard, information in the signals 230 or information derived/determined from the information in the signals 230, such as geo-location coordinates and/or movement map 236 are used as inputs to the first ML model(s) 430-1 to detect any anomalies in data set movement 432 within the third-party entity 300.

As discussed in relation to FIG. 2, in other specific embodiments of the system 100, tracking beacons 220 are configured to trigger, upon signal transmission, acquisition and initiation of transmission of access log(s) 310 which indicate, at least, one or more (i) the time 312 or which a data set was accessed, (ii) party identity 442 of parties who accessed the data and (iii) actions 316 that were performed on the data during the access occurrence (e.g., copied, modified, deleted, read-only and the like). In such embodiments of the system 100, data anomaly detection platform 410 is configured to train at least one second ML model 430-2 from amongst the one or more ML models 430 to detect anomalies in data set access 438 within the third-party entity 300. Anomalies in data set access 438 include, but are not limited to, (i) access time 440 anomalies, (ii) access party identification 442 anomalies and (iii) anomalies in actions 446 performed. Such training is based, at least, on historical access patterns of data sets within the third-party of the same/similar or data sets, such as access time patterns, accessing parties' patterns and/or actions performed patterns. The historical access patterns may be identified from captured access logs 310 or by any other means. Thus, in specific embodiments of the system, the ML model is specific to the third-party-entity and same or similar data sets. Moreover, in further specific embodiments of the invention, the training is based on predetermined rules, which define prescribed access attributes, such as authorized access times, authorized parties, authorized actions and the like.

Once the second ML models 430-2 have been initially trained and the access log(s) 310 have been received by the data transmitting entity, data anomaly detection platform 410 is configured to data anomaly detection platform 410 is configured to execute the second ML models 430-2 to detect anomalies in data set access 438 within the third-party entity 300 based, at least, on information in the access logs 310.

In further specific embodiments of the system 100, data anomaly detection platform 410 is configured to train at least one third ML model 430-3 from amongst the one or more ML models 430 to detect anomalies in the data set replication/duplication 450 (i.e., copying of data) within the third-party entity 300. Such training is based, at least, on historical movement and/or replication patterns of data sets within the third-party of the same/similar or data sets. The historical movement and/or replication patterns may be identified from duplicative signals 230 transmitted by tracking beacons 220 or by any other means. Thus, in specific embodiments of the system, the third ML model 430-3 is specific to the third-party-entity and same or similar data sets. Moreover, in further specific embodiments of the invention, the training is based on predetermined rules, which define prescribed replication parameters, such whether the data set is authorized for replication and by whom and the like.

Once the third ML model 430-3 has been initially trained and the data set 210 has been transmitted to the third-party entity 300, data anomaly detection platform 410 is configured to receive signals 230 from tracking beacon(s) 220, such as duplicate signals 452 from multiple instances of the same tracking beacon and execute at least one of the third ML model(s) to detect anomalies in the replication of the data set 450 at the third-party entity based at least on the duplicate signals 452 from the multiple instances of the same tracking beacon 220.

Additionally, in specific embodiments of the system 100, once anomalies have detected, the data anomaly detection platform may be configured to perform remediation actions, such as generating and initiation communication of notifications to the third-party entity that indicate the occurrence of the anomaly and data surrounding the anomaly. In other specific embodiments of the system, detection of one or more anomalies may trigger retraction/call-back of the data set from the third-party entity or implementing restrictions on the data set, such as no further movement, access or the like. Retraction/call back of the data set or implementing restrictions on movement and/or access may be triggered by detection of certain predefined anomalies identified as high peril anomalies or an occurrence of a threshold volume of anomalies.

Referring to FIG. 4, a flow diagram is a depicted of a method 500 for detecting anomalies in movement of data post-data transmission, in accordance with embodiments of the present invention. At Event 510, at least one first ML model is trained to detect anomalies in the movement of a data set within a third-party entity, e.g., service provider, vendor, client or the like. Anomalies in data set movement include, but are not limited to, anomalies in geo-location and data route (i.e., hops within the third-party entity). Such training of the first ML model(s) is based, at least, on historical movement patterns of data sets within the third-party of the same/similar or data sets, such as, geo-location patterns and/or data route patterns. The historical movement patterns may be identified from signals transmitted by tracking beacons or by any other means. Thus, in specific embodiments of the method, the ML model is specific to the third-party-entity and same or similar data sets. Moreover, in further specific embodiments of the invention, the training is based on predetermined rules, which define prescribed movement attributes, such as locations where data sets are authorized and/or unauthorized (i.e., geo-boundaries) to be located/moved within, networks/devices which the data set are authorized or unauthorized to be processed and/or stored on and the like.

In response to first ML model training, at Event 520, a data set is received that is destined for transmission to a third-party. In accordance with embodiments of the present invention, the data transmitting entity desires to maintain a level of control over the data after the data is no longer in their possession. In this regard, the data transmitting entity may desire to ensure that the data is only (i) located/stored in designated location and/or designated devices, or (ii) accessed by authorized parties, during authorized time period, and/or (iii) undergoes authorized actions when accessed.

In response to receiving the data set, at Event 530, one or more tracking beacon is generated (or otherwise identified) and inserted within data set. The tracking beacon may be a GPS tracking beacon or the like configured to transmit GPS coordinates in signals communicated by the beacon. The tracking beacons may be configured such that signals are communicated each time the data set encounters a new hop (e.g., server, router, switch, storage device or the like) at the third-party entity or after a predetermined time period (i.e., once every X second or the like) As previously discussed, in specific embodiments of the invention, the third-party entity will have acquiesced in the inclusion of such tracking beacons within the data set. In other specific embodiments of the method/invention, so-called "mock" tracking beacons may be additionally inserted within the data set, such that unknowing parties (e.g., nefarious entities and/or third-party entities) are unable to discern between actual tracking beacons (which transmit signals) and mock tracking beacons (which do not transmit signals). In response to inserting the tracking beacon(s) in the data set, transmission of the data set to the third-party entity is initiated.

At Event 540, signals from the one or more tracking beacons are received. In specific embodiments of the invention the signals will include information pertinent to the detection of anomalies, while in other instances the relevant/pertinent information is derived form information included in the signals. At Event 550, at least one of the first ML models is executed to detect anomalies in movement of the data set within the third-party entity based, at least on the information included in the signals from the tracking beacons. In response to detecting anomalies in the movement, in specific embodiments of the method, the data set may be retracted from the third-party entity or restrictions on movement and/or access may be applied to the data set.

FIG. 5 illustrates an exemplary machine learning (ML) subsystem architecture 600, in accordance with an embodiment of the invention. The machine learning subsystem 600 includes a data acquisition engine 602, data ingestion engine 610, data pre-processing engine 616, ML model tuning engine 622, and inference engine 636.

The data acquisition engine 602 identifies various internal and/or external data sources to generate, test, and/or integrate new features for training the machine learning model 624. These internal and/or external data sources 604, 606, and 608 may be initial locations where the data originates or where physical information is first digitized. The data acquisition engine 602 identifies the location of the data and describes connection characteristics for access and retrieval of data. In some embodiments, data is transported from each data source 604, 606, or 608 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, these data sources include Enterprise Resource Planning (ERP) database(s) 604 that host data related to day-to-day business activities such as accounting, procurement, project management, exposure management, supply chain operations, and/or the like, mainframe 606 that is often the entity's central data processing center, edge device(s) 608 that may be any piece of hardware, such as sensors, actuators, gadgets, appliances, or machines, that are programmed for certain applications and can transmit data over the internet or other networks, and/or the like. The data acquired by the data acquisition engine 602 from these data sources 604, 606, and 608 is transported to the data ingestion engine 610 for further processing.

Depending on the nature of the data imported from the data acquisition engine 602, the data ingestion engine 610 may move the data to a destination for storage or further analysis. Typically, the data imported from the data acquisition engine 602 is in varying formats as the data comes from different sources, including Rational Database Management Systems (RDBMs), other types of databases, Simple Storage Service (S3) buckets, Commas-Separated Value (CSVs), or from streams. Since the data comes from different entities, the data needs to be cleansed and transformed so that it can be analyzed together with data from other sources. At the data ingestion engine 610, the data may be ingested in real-time, using the stream processing engine 612, in batches using the batch data warehouse 614, or a combination of both. The stream processing engine 612 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 614 collects and transfers data in batches according to scheduled intervals, trigger events, or any other logical ordering.

In machine learning, the quality of data and the useful information that can be derived therefrom directly affects the ability of the machine learning model 624 to learn. The data pre-processing engine 616 implements advanced integration and processing steps needed to prepare the data for machine learning execution. This includes modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 616 implements feature extraction and/or selection techniques to generate training data 618. Feature extraction and/or selection is a process of dimensionality reduction by which an initial set of data is reduced to more manageable groups for processing. A characteristic of these large data sets is a large number of variables that require sizeable computing resources to process. Feature extraction and/or selection may be used to select and/or combine variables into features, effectively reducing the amount of data that must be processed, while still accurately and completely describing the original data set. Depending on the type of machine learning algorithm being used, training data 618 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 622 may be used to train a machine learning model 624 using the training data 618 to make predictions or decisions without explicitly being programmed to do so. The machine learning model 624 represents what was learned by the selected machine learning algorithm 620 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model, the ML model tuning engine 622 repeatedly executes cycles of initialization/experimentation 626, testing 628, and tuning 630 to optimize the performance of the machine learning model 624 and refine the results in preparation for deployment of those results for consumption or decision making. To this end, the ML model tuning engine 622 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 618. A fully trained machine learning model 632 is one whose hyperparameters are tuned and model accuracy maximized.

The trained machine learning model 632, similar to any other software application output, can be persisted to storage, file, memory, or application, or looped back into the processing component to be reprocessed. More often, the trained machine learning model 632 is deployed into an existing production environment to make practical decisions based on live data 634 (such as, in accordance with the present invention, signals from beacons, data derived from beacon signals, movement/route maps and the like). To this end, the machine learning subsystem 600 uses the inference engine 636 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 638) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 638) live data 634 based on how similar they are to one another to solve exploratory challenges where little is known about the data, provide a description or label (e.g., C_1, C_2 . . . C_n 638) to live data 634, such as in classification, and/or the like. These categorized outputs, groups (clusters), or labels are then presented to the user input system, such as data set anomaly detection platform 410. In still other cases, machine learning models that perform regression techniques may use live data 634 to predict or forecast continuous outcomes.

It will be understood that the embodiment of the machine learning subsystem 600 illustrated in FIG. 5 is exemplary and that other embodiments may vary. As another example, in some embodiments, the machine learning subsystem 600 includes more, fewer, or different components.

Thus, as described in detail above, present embodiments of the invention include systems, methods, computer program products and/or the like that implement Artificial-Intelligence (AI), specifically Machine Learning (ML) models to detect anomalies in data movement and/or access post-data transmission. Specifically, tracking beacons, which are configured to transmit signals periodically and/or when encountering a hop in a data route, are inserted in data sets prior to transmitting the data sets to a third-party entity. In specific embodiments, the transmission of a tracking beacon signal triggers acquisition and initiates communication of access logs. In response to receiving signals from the tracking beacons and/or access logs, ML models which have been trained to detect anomalies in data movement and/or access based on historical movement and/or access patterns of the same/similar data sets are executed to detect any such anomalies based, at least on information included within and/or derived from the tracking beacon signal and/or the access logs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting anomalies in data movement post-data transmission, the system comprising:

a first computing platform including a first memory and one or more first computing processor devices in communication with the first memory, wherein the first memory stores:

a tracking beacon deployment platform executable by at least one of the one or more computing processor devices and configured to:

receive a data set that is configured for transmission to a third-party entity, generate, and insert within the data set, one or more tracking beacons, transmit the data set with the one or more inserted tracking beacons to the third-party entity; and a second computing platform including a second memory and one or more second computing processor devices in communication with the second memory, wherein the second memory stores:

a data set anomaly detection platform including an Artificial Intelligence (AI) engine comprising one or more Machine Learning (ML) models wherein the data set anomaly detection platform is executable by at least one of the one or more second computing processor devices, and configured to:

train at least one first ML model from amongst the one or more ML models to detect anomalies in movement of data sets within the third-party entity based on historical movement patterns of data sets within the third-party;

receive signals from the one or more tracking beacons, and execute the at least one first ML model to detect anomalies in movement of the data set within the third-party entity based, at least, on the signals from the one or more tracking beacons.

2. The system of claim 1, wherein the data set anomaly detection platform is further configured to:

train the at least one first ML model to detect the anomalies in the movement of data sets within the third-party entity based on historical movement patterns of data sets within the third-party entity, wherein the anomalies in movement are defined as anomalies in a geo-location of the datasets and the historical movement patterns are defined as historical geo-location patterns.

3. The system of claim 2, wherein the data set anomaly detection platform is further configured to:

derive one or more geo-locations of the data set from information included in the signals from the one or more tracking beacons, and execute the at least one first ML model to detect anomalies in the one or more geo-locations of the data set within the third-party entity based on the derived one or more geo-locations of the data set.

4. The system of claim 1, wherein the tracking beacon deployment platform is further configured to:

generate, and insert within the data set, the one or more tracking beacons, wherein the one or more tracking beacons are configured to transmit a signal for each instance of the data set encountering a hop in a data route within, at least, the third-party entity.

5. The system of claim 4, wherein the data set anomaly detection platform is further configured to:

identify hops that the data set encounters at the third-party entity from information included in the signals from the one or more tracking beacons, generate a time-based movement map of the data set within the third-party entity that includes the identified hops, and execute the at least one first ML models to detect anomalies in the data route of the data set within the third-party entity based, at least, on the time-based movement map.

6. The system of claim 1, wherein the tracking beacon deployment platform is further configured to:

generate, and insert within the data set, the one or more tracking beacons, wherein the one or more tracking beacons are configured to trigger, upon transmission of the signals, communication of at least one access log to the data set anomaly detection platform, wherein the at least one access log indicates one or more of (i) times at which the data set was accessed (ii) identities of accessing parties and (iii) actions performed on the data set during a corresponding access occurrence.

7. The system of claim 6, wherein the data set anomaly detection platform is further configured to:

train at least one second ML model from amongst the one or more ML models to detect anomalies in at least one of (i) when the data set is accessed, (ii) who accessed the data set and (iii) actions performed on the data set based on historical access patterns of data sets within the third-party entity, receive the at least one access log from the third-party entity, and execute the at least one second ML model to detect anomalies in the accessing the data set within the third-party entity based, at least, on information in the at least one access log.

8. The system of claim 1, the data set anomaly detection platform is further configured to:

train at least one third ML model from amongst the one or more ML models to detect anomalies in data set replication based on historical data set movement patterns of data sets within the third-party entity, and execute the at least one third ML model to detect anomalies in data set replication within the third-party entity based, at least, on the signals from the one or more tracking beacons, wherein the anomalies in data set replication are detected based on receiving signals from at least two instances of the one or more tracking beacons.

9. A computer-implemented method for detecting anomalies in data movement post-data transmission, the computer-implemented method executed by one or more computing processor devices and comprising:

training at least one first ML models to detect anomalies in movement of data sets within a third-party entity based on historical movement patterns of data sets within the third-party;

receiving a data set that is configured for transmission to a third-party entity;

generating, and inserting within the data set, one or more tracking beacons;

transmitting the data set with the one or more inserted tracking beacons to the third-party entity;

receiving signals from the one or more tracking beacons; and executing the at least one first ML models to detect anomalies in movement of the data set within the third-party entity based, at least, on the signals from the one or more tracking beacons.

10. The computer-implemented method of claim 9, wherein training further comprises:

training the at least one first more ML model to detect the anomalies in the movement of data sets within the third-party entity based on historical movement patterns of data sets within the third-party entity, wherein the anomalies in movement are defined as anomalies in a geo-location of the datasets and the historical movement patterns are defined as historical geo-location patterns, wherein the computer-implemented method further comprises:

deriving one or more geo-locations of the data set from information included in the signals from the one or more tracking beacons, and wherein executing further comprises:

executing the at least one first ML model to detect anomalies in the one or more geo-locations of the data set within the third-party entity based on the derived one or more geo-locations of the data set.

11. The computer-implemented method of claim 9, wherein generating further comprises:

generating, and inserting within the data set, the one or more tracking beacons, wherein the one or more tracking beacons are configured to transmit a signal for each instance of the data set encountering a hop in a data route within, at least, the third-party entity, wherein the computer-implemented method further comprises:

identifying hops that the data set encounters at the third-party entity from information included in the signals from the one or more tracking beacons; and generating a time-based movement map of the data set within the third-party entity that includes the identified hops, and wherein executing further comprises:

executing the at least one first ML model to detect anomalies in the data route of the data set within the third-party entity based, at least on the time-based movement map.

12. The computer-implemented method of claim 9, wherein generating further comprises:

generating, and inserting within the data set, the one or more tracking beacons, wherein the one or more tracking beacons are configured to trigger, upon transmission of the signals, communication of at least one access log to the data set anomaly detection platform, wherein the at least one access log indicates one or more of (i) times at which the data set was accessed (ii) identities of accessing parties and (iii) actions performed on the data set during a corresponding access occurrence.

13. The computer-implemented method of claim 12, further comprising:

training at least one second ML model from amongst the one or more ML models to detect anomalies in at least one of (i) when the data set is accessed, (ii) who accessed the data set and (iii) actions performed on the data set based on historical access patterns of data sets within the third-party entity, receiving the at least one access log from the third-party entity, and executing the at least one second ML model to detect anomalies in the accessing of the data set within the third-party entity based, at least, on information in the at least one access log.

14. The computer-implemented method of claim 9, further comprising:

training at least one third ML models from amongst the one or more ML models to detect anomalies in data set replication based on historical data set movement patterns of data sets within the third-party; and executing the at least one third ML models to detect anomalies in data set replication within the third-party entity based, at least, on the signals from the one or more tracking beacons, wherein the anomalies in data set replication are detected based on receiving signals from at least two instances of the one or more tracking beacons.

15. A computer program product including a non-transitory computer-readable medium, the non-transitory computer-readable medium comprising sets of codes for causing one or more computing devices to:

train at least one first ML models to detect anomalies in movement of data sets within a third-party entity based on historical movement patterns of data sets within the third-party;

receive a data set that is configured for transmission to a third-party entity;

generate, and insert within the data set, one or more tracking beacons;

transmit the data set with the one or more inserted tracking beacons to the third-party entity;

receive signals from the one or more tracking beacons; and execute the at least one first ML models to detect anomalies in movement of the data set within the third-party entity based, at least, on the signals from the one or more tracking beacons.

16. The computer program product of claim 15, wherein the set of codes configured to cause the one or more computer devices to train are further configured to cause the one or more computer devices to:

train the at least one first more ML model to detect the anomalies in the movement of data sets within the third-party entity based on historical movement patterns of data sets within the third-party entity, wherein the anomalies in movement are defined as anomalies in a geo-location of the datasets and the historical movement patterns are defined as historical geo-location patterns, wherein the sets of codes further comprise a set of codes for causing the one or more computing devices to:

derive one or more geo-locations of the data set from information included in the signals from the one or more tracking beacons, and wherein the set of codes configured to cause the one or more computer devices to execute are further configured to cause the one or more computer devices to:

execute the at least one first ML model to detect anomalies in the one or more geo-locations of the data set within the third-party entity based on the derived one or more geo-locations of the data set.

17. The computer program product of claim 15, wherein the set of codes configured to cause the one or more computer devices to generate are further configured to cause the one or more computer devices to:

generate, and insert within the data set, the one or more tracking beacons, wherein the one or more tracking beacons are configured to transmit a signal for each instance of the data set encountering a hop in a data route within, at least, the third-party entity, wherein the sets of codes further comprise a set of codes for causing the one or more computing devices to:

identify hops that the data set encounters at the third-party entity from information included in the signals from the one or more tracking beacons; and generate a time-based movement map of the data set within the third-party entity that includes the identified hops, and wherein the set of codes configured to cause the one or more computer devices to execute are further configured to cause the one or more computer devices to:

execute the at least one first ML model to detect anomalies in the data route of the data set within the third-party entity based, at least, on the time-based movement map.

18. The computer program product of claim 15, wherein the set of codes configured to cause the one or more computer devices to generate are further configured to cause the one or more computer devices to:

generate, and insert within the data set, the one or more tracking beacons, wherein the one or more tracking beacons are configured to trigger, upon transmission of the signals, communication of at least one access log to the data set anomaly detection platform, wherein the at least one access log indicates one or more of (i) times at which the data set was accessed (ii) identities of accessing parties and (iii) actions performed on the data set during a corresponding access occurrence.

19. The computer program product of claim 18, wherein the sets of codes further comprise sets of codes for causing the one or more computing devices to:

train at least one second ML model from amongst the one or more ML models to detect anomalies in at least one of (i) when the data set is accessed, (ii) who accessed the data set and (iii) actions performed on the data set based on historical access patterns of data sets within the third-party entity, receive the at least one access log from the third-party entity, and execute the at least one second ML model to detect anomalies in the accessing of the data set within the third-party entity based, at least, on information in the at least one access log.

20. The computer program product of claim 15, wherein the sets of codes further comprise sets of codes for causing the one or more computing devices to:

train at least one third ML models from amongst the one or more ML models to detect anomalies in data set replication based on historical data set movement patterns of data sets within the third-party; and execute the at least one third ML models to detect anomalies in data set replication within the third-party entity based, at least, on the signals from the one or more tracking beacons, wherein the anomalies in data set replication are detected based on receiving signals from at least two instances of the one or more tracking beacons.

* * * * *